US008380702B2

(12) United States Patent
Baby et al.

(10) Patent No.: US 8,380,702 B2
(45) Date of Patent: Feb. 19, 2013

(54) LOADING AN INDEX WITH MINIMAL EFFECT ON AVAILABILITY OF APPLICATIONS USING THE CORRESPONDING TABLE

(75) Inventors: Thomas Baby, Maple Valley, WA (US); Ali Maleki Tabar, Stanford, CA (US); Sivasankaran Chandrasekar, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 249 days.

(21) Appl. No.: 12/401,397

(22) Filed: Mar. 10, 2009

(65) Prior Publication Data

US 2010/0235348 A1    Sep. 16, 2010

(51) Int. Cl.
*G06F 17/30* (2006.01)
(52) U.S. Cl. ............... 707/715; 707/830; 707/968
(58) Field of Classification Search .......... 707/715, 707/711, 830, 968, E17.005, E17.054, 999.203, 707/999.204
See application file for complete search history.

(56) References Cited

U.S. PATENT DOCUMENTS

| | | | |
|---|---|---|---|
| 5,452,445 A | | 9/1995 | Hallmark et al. |
| 6,014,656 A * | | 1/2000 | Hallmark et al. ............ 1/1 |
| 6,105,025 A * | | 8/2000 | Jacobs et al. ............ 1/1 |
| 6,199,062 B1 * | | 3/2001 | Byrne et al. ............ 1/1 |
| 6,353,821 B1 * | | 3/2002 | Gray ............ 707/715 |
| 6,714,943 B1 | | 3/2004 | Ganesh et al. |
| 6,728,719 B1 | | 4/2004 | Ganesh et al. |
| 6,778,977 B1 * | | 8/2004 | Avadhanam et al. ...... 707/737 |
| 6,920,460 B1 * | | 7/2005 | Srinivasan et al. ...... 1/1 |
| 6,983,286 B1 * | | 1/2006 | Sinha et al. ............ 707/719 |
| 7,096,224 B2 * | | 8/2006 | Murthy et al. ............ 707/763 |
| 7,647,298 B2 * | | 1/2010 | Adya et al. ............ 707/999.002 |
| 7,725,485 B1 * | | 5/2010 | Sahami et al. ............ 707/767 |
| 7,814,117 B2 * | | 10/2010 | Baby et al. ............ 707/769 |
| 2004/0199530 A1 * | | 10/2004 | Avadhanam et al. ...... 707/100 |
| 2004/0243624 A1 * | | 12/2004 | Marwah ............ 707/103 R |
| 2005/0125430 A1 * | | 6/2005 | Souder et al. ............ 707/100 |
| 2006/0155679 A1 * | | 7/2006 | Kothuri et al. ............ 707/3 |
| 2007/0016555 A1 * | | 1/2007 | Ito et al. ............ 707/2 |
| 2007/0106683 A1 * | | 5/2007 | Grabelsky et al. ............ 707/102 |
| 2007/0198615 A1 * | | 8/2007 | Krishnamurthy et al. ...... 707/205 |
| 2007/0214191 A1 * | | 9/2007 | Chandrasekaran ...... 707/202 |

(Continued)

OTHER PUBLICATIONS

Morales, Tony, et al., Oracle Database: VLDB and Partitioning Guide—11g Release 1 (11.1), Part No. B32024-01, Oracle Corp., Redwood City, CA, Jul. 2007, 216 pages.*

(Continued)

*Primary Examiner* — Anh Ly
(74) *Attorney, Agent, or Firm* — Hickman Palermo Truong Becker Bingham Wong LLP

(57) ABSTRACT

A database server provides a partitioned table with a corresponding locally partitioned index. When a request is made to load data into the table by an application, a table partition, along with a corresponding index partition, is created for the application. The corresponding index partition in marked as asynchronously maintained, allowing other index partitions to be used by the query optimizer in formulating query plans for other table partitions. Once the loading of data is complete, a synchronization operation is called with the result of conforming the data in the asynchronously maintained index partition with its corresponding table in which the data was loaded. Once the data in the corresponding table partition and the data in the asynchronously maintained index partition are synchronized, the asynchronously maintained index partition is marked as synchronously maintained.

14 Claims, 4 Drawing Sheets

U.S. PATENT DOCUMENTS

| | | | |
|---|---|---|---|
| 2008/0046480 A1* | 2/2008 | Lou | 707/202 |
| 2008/0098045 A1* | 4/2008 | Radhakrishnan et al. | 707/203 |
| 2008/0249990 A1* | 10/2008 | Baby et al. | 707/3 |
| 2009/0006380 A1* | 1/2009 | Agrawal et al. | 707/5 |
| 2009/0006431 A1* | 1/2009 | Agrawal et al. | 707/E17.014 |
| 2009/0182779 A1* | 7/2009 | Johnson | 707/E17.005 |
| 2009/0210429 A1* | 8/2009 | Agrawal et al. | 707/10 |
| 2009/0240711 A1* | 9/2009 | Levin | 707/100 |
| 2010/0036886 A1* | 2/2010 | Bouloy et al. | 707/200 |

OTHER PUBLICATIONS

Oracle Corp., "Oracle 9i Flashback Query", Oracle 9i Database Daily Feature, Apr. 18, 2002, pp. 1-2.*

Transact-SQL Users Guide: Adaptive Server Enterprise 15.0, Document ID: DC32300-01-1500-02, Sybase, Inc.., Dublin, CA, Oct. 2005, 82 pages.*

Hyun J. Moon, Carlo A. Curinoy, Myungwon Ham and Carlo Zaniolo—"Prima: Archiving and Querying Historical Data with Evolving Schemas"—SIGMOD'09, Jun. 29-Jul. 2, 2009, Providence, Rhode Island, USA (pp. 1019-1021).*

Andrew Witkowski, Srikanth Bellamkonda, Hua-Gang Li, Vince Liang, Lei Sheng, Wayne Smith, Sankar Subramanian, James Terry, and Tsae-Feng Yu—"Continuous Queries in Oracle"—VLDB '07, Sep. 23-28, 2007, Vienna, Austria, (pp. 1173-1184).*

David Litchfield—"Oracle Forensics Part 6: Examining Undo Segments, Flashback and the Oracle Recycle Bin"—An NGSSoftware Insight Security Research (NISR) Publication ©2007 Next Generation Security Software Ltd http://www.ngssoftware.com—Aug. 16, 2007, pp. 1-18.*

David Gornshtein and Boris Tamarkin—"Features, strengths and weaknesses comparison between MS SQL 2005 (Yukon) and Oracle 10g databases"—2004 WisdomForce Technologies, Inc.—pp. 1-29.*

Tirthankar Lahiri et al., 50,000 Users on an Oracle8 Universal Server Database, 1998, ACM, pp. 528-530.

Benoit Dageville et al., SQL Memory Management in Oracle9i, Aug. 2002, ACM, pp. 962-973.

* cited by examiner

LOADING AN INDEX WITH MINIMAL EFFECT ON AVAILABILITY OF APPLICATIONS USING THE CORRESPONDING TABLE

CROSS REFERENCE TO RELATED APPLICATIONS

The application is related to U.S. application Ser. No. 11/784,341, entitled "Accessing Data From Asynchronously Maintained Index," filed on Apr. 5, 2007 by Thomas Baby, et al. now U.S. Pat. No. 7,814,117, the contents of which are incorporated by reference.

FIELD OF THE INVENTION

The present invention relates generally to database management and, more specifically, to techniques for efficient loading of data.

BACKGROUND

Database systems allow for the creation of indexes. Indexes assist the database system with quickly satisfying search requests on indexed tables. An index contains key values derived from data stored in attributes of a table, referred to as base table. Typically, the index is organized (e.g. ordered) by the key values to provide efficient access to data in the base table. For example, a table containing 10 columns may have a corresponding index where one of the columns is a key column and the entries of an index are ordered by the key values in the key column.

Many types of data are indexed, and may use a native index that is built into the database server or any other kind of index. Indexes may be created and maintained for a base table by submitting Data Definition Language (DDL) statements to database system. Once defined in this way, when changes are made to a base table, corresponding changes are automatically made to indexes by the database system.

Storage and Indexing of XML Data

An object-relational database system may be configured to store XML data and to allow access using XML and/or objectional relational constructs. Such database systems also create and maintain forms of indexes that facilitate access to XML data. A database system that has been configured in this way may be referred to as an embodiment of an XML DB. Other XML DB embodiments provide alternate means of storing XML data.

To store an XML document, the document may be stored as a large string of characters in a large object, or the XML document may be decomposed into elements of fragments that are stored as objects in a database, each object being an object of an object class storing portions of XML documents.

To provide efficient access to a collection of XML documents, a "logical index", referred to herein as a XML index, may be used to index a collection of XML documents. A XML index contains multiple structures that are cooperatively used to access a collection XML documents. According to an embodiment of the present invention, a logical index includes a path table, which contains information about the hierarchies of nodes in a collection XML documents and may contain the value of the nodes. Among the columns or attributes of the path table that serve as keys is a column that stores path representations of the path of the nodes. For a particular XML document, the path table may contain multiple rows, each row holding a particular node value (e.g. element) of the XML document, and a path representation of the node's path within the XML document, among other information.

Partitioning Tables and Indexes

Table partitioning allows a table to be divided in subtables referred to as partitions. Tables are partitioned according to partition criteria. For example, data for sales transactions represented by rows in a table may be partitioned by a column representing the month the sales, or by the region in which in which the sale was made. A column upon which partitioning is based is referred to as a partition key. Because partitions are based on a key that has logical significance, breaking up large tables into smaller sub-tables makes the data set more manageable.

Like an index's respective base table, an index may be partitioned. A partitioned index may be a global partitioned index or a local partitioned index. A global partitioned index is an index which is not partitioned based on the same key as the table indexed by the index. A local partitioned index is an index which is partitioned on the same key on which the table is partitioned.

When an XML index is locally partitioned, all rows in the path table of the XML index corresponding to a row in the base table are in the same partition. Further, if two rows in the base table are in different partitions, then their corresponding rows in the path table are in different partitions.

Bulk Changes to Partitions

In a database system, the problem of loading large amounts of data into a table that is being used by running applications can be facilitated using techniques that involve table partitioning. For example, when a large number of documents are to be loaded into a table, a new partition may be created, and the new data may be inserted into this partition. Either single row insertions or bulk load using a utility can be used such as SQLLOADER from Oracle Corporation.

When indexes are present, the indexes need to be updated after inserting data into the table that is indexed. The updates may be performed synchronously. However, this approach prolongs the amount of time to update the partition, particularly for complex indexes such as the XML index. An approach that addresses this issue involves disabling the index during bulk load and asynchronously updating the index after the upload.

Asynchronously Maintained Index

In contrast to a synchronously maintained index, which by definition results in the index update and the indexed table update occurring as an atomic unit, with an asynchronously maintained index, the insertions into the indexed table are not immediately propagated to the index. Instead, an explicit synchronization ("sync") operation must be performed for the index to populate table entries corresponding to the new rows in the indexed table. A sync operation results in updating the index entries to accurately reflect the data in the rows of the indexed table.

Asynchronously updating an index for a bulk load has the advantage of higher throughput. However, the asynchronously updated index may be unusable until it is synchronized. As a result, a query optimizer may not use the index in execution plans it generates, leading to use of less efficient execution plans.

Rather than disable an index, another approach, the flashback rewrite approach, rewrites queries that access the base table as flashback queries. A flashback query is a query that returns data that is consistent with a past state of a database. A flashback query is associated with a flashback time. The data returned is consistent with a database state associated with the flashback time. An example of a flashback time is system change number (SCN).

Under the flashback rewrite approach, the logical time an index is disabled is tracked. Queries are rewritten as flashback queries, where the flashback time is set to a time at or earlier than the time tracked for disabling the index.

An advantage to the flashback rewrite approach is that the index is not disabled and can be used to execute queries. A disadvantage is that existing database applications see stale results. Another disadvantage is that flashback queries incur more overhead to execute. Since more undo log records need to be consulted, flashback queries are slower than non-flashback queries.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

Figure 1:
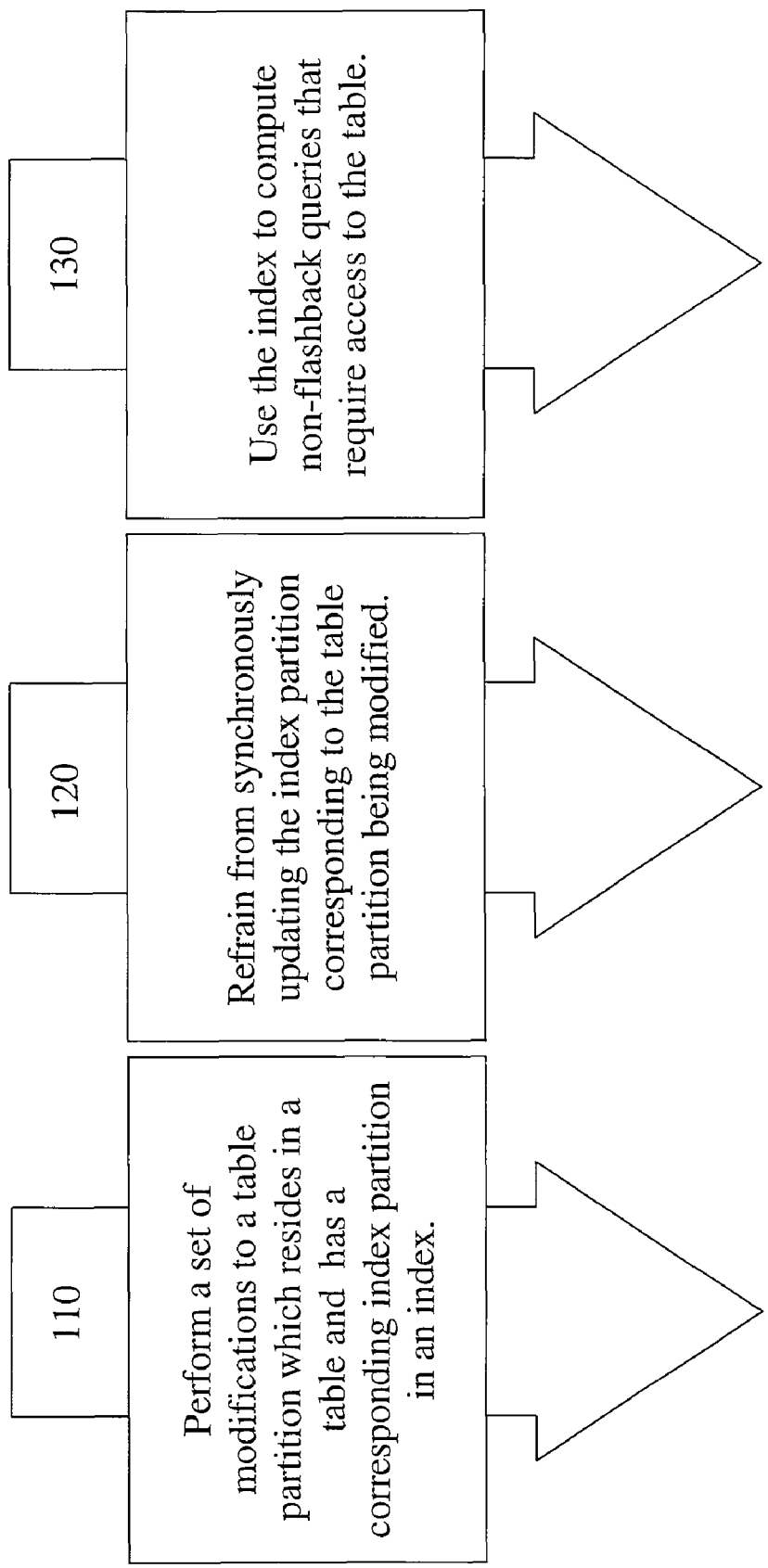
FIG. 1 is a flow diagram illustrating a timeline of an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview of Embodiments

In one embodiment of the invention, the solution to the problem of bulk loading data to a table partition indexed by a local index partition is to mark and treat the local partition as asynchronously maintained. Other local partitions are synchronously maintained.

In an embodiment of the invention, when data is to be loaded into a partition of a base table, a new table partition is created in the table and a corresponding index partition is created in the index. Existing partitions in the index are synchronously maintained, but the new partition in the index is marked for asynchronous maintenance.

Since only the particular index partition is marked as asynchronously maintained rather than the entire index, the entire index is not marked as unusable, and other synchronously maintained index partitions continue to maintain current data. This is because partitions that are synchronously maintained are updated at the same time the corresponding partitions in the indexed table are updated.

This approach is suitable in an environment in which an application generally accesses only one or a subset of partitions. An application is a set of one or more process that runs on behalf of a particular user entity. A user entity may be, for example, a session, group of users, or a process executing a remote call from a particular client.

For example, a certain application can be a set of processes running for users of a particular organization whose access control lists ("ACL") are stored in a certain partition of an ACL table that stores ACLs. Only ACLs of the particular organization are stored in the certain partition. The ACL table has an "XMLType" column, which holds ACLs. Each ACL is an XML document stored in a particular row in the XMLType column. In general, among all the applications accessing the ACL table, only the certain application accesses the certain partition.

The ACL table is also indexed by an XML index. The XML index is locally partitioned.

When a new partition is created and new ACLs are loaded into the new partition, an application that accesses the new ACLs should not be running and will not be accessing the new partition. Other running applications access the other partitions whose index partitions are being synchronously maintained.

Since only the new partition is marked as asynchronously maintained, the other applications that rely on the other synchronously maintained partitions will be able to continue to access current data. There is no need to rewrite queries issued by these applications to flashback queries. There is no staleness in query results, since other index partitions are synchronously maintained. Further, because the index is not marked as unusable, the query optimizer may use the index in execution plans it generates for the other applications.

As rows are inserted or otherwise added into the new partition, the ACLs stored in the rows are not shredded in elements that are stored in path table rows nor added to the index partition of the new table partition. Instead the rows are logged into the pending table to be loaded in a batch process later.

When the load into the new partition is complete, the index partition is synchronized to its corresponding indexed table partition in which data was loaded. This synchronization may take place automatically, through the initiation of a user or administrator, or any other means.

In the case of the XML index, one DML statement can be issued to perform the synchronization operation, allowing the database management system to exploit parallelism and other efficiency features associated with bulk loading of data in a database management system. Finally, the index partition is marked for synchronous maintenance.

In another embodiment of the invention, data may be loaded into an existing partition, rather than a new partition. When data is to be loaded into a particular existing partition of a base table, the particular index partition, corresponding to the table in which data is to be loaded, is marked for asynchronous maintenance, while other existing partitions in the index are synchronously maintained.

The applications that are not loading data will still have access to current data, as the corresponding index partitions for these applications will continue to be synchronously maintained. However, the benefits derived from parallelism and other efficiency features are greater when the partition in which data is to be loaded is a new partition.

While the present example has described the invention as applied to an XML index, those skilled in the art will recognize that the invention clearly applies to many other types of indexes to achieve similar results. The invention is not in any way limited to use on XML indexes.

Example Operating Environment

FIG. 1 is a flowchart illustrating a timeline of an embodiment of the invention. Steps 110, 120, and 130 occur concurrently. At step 110, a set of modifications is performed on a table partition which resides in a table and has a corresponding index partition in an index. At step 120, the index partition corresponding to the table partition being modified is not synchronously updated. At step 130, the index is used to compute non-flashback queries that require access to the table by running applications that do not access the partition that is not being synchronously maintained. A non-flashback query is one that has not been rewritten to be a flashback query.

Figure 2:
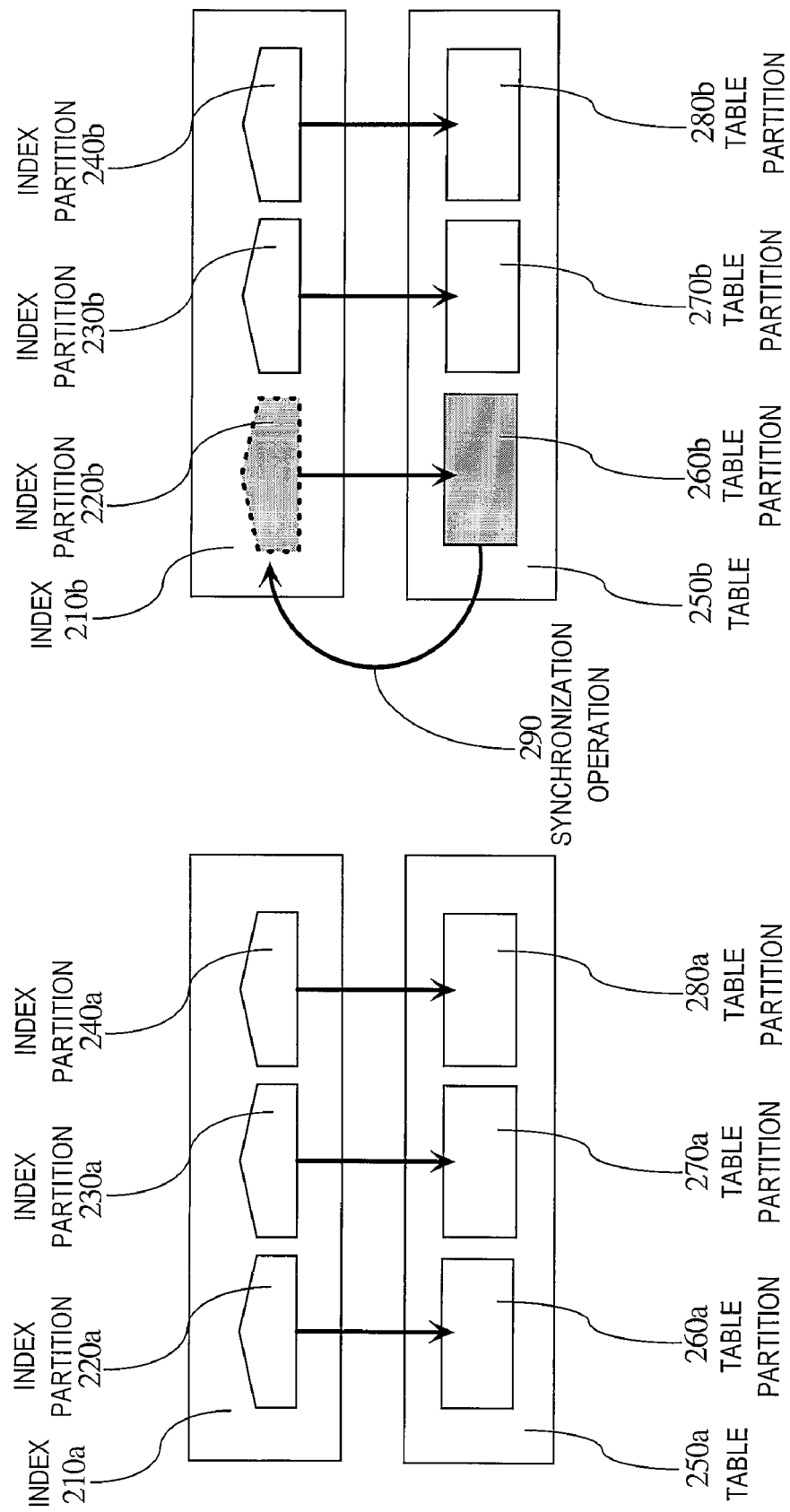
FIG. 2 is a block diagram illustrating a partitioned table and a corresponding partitioned index on which an embodiment of the invention may be implemented.
Figure 3:
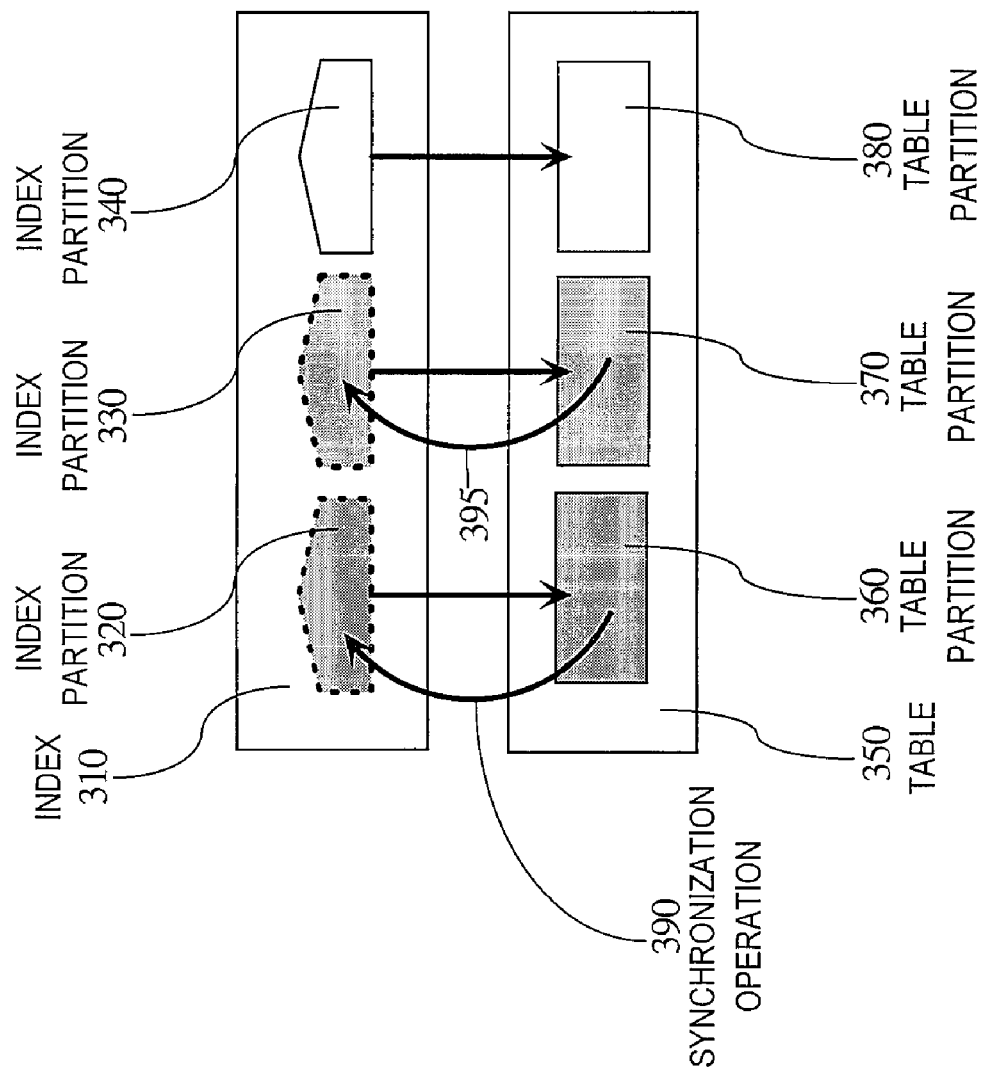
FIG. 3 is a block diagram illustrating a partitioned table and a corresponding partitioned index on which an embodiment of the invention may be implemented.

FIG. 2A is a block diagram illustrating a partitioned table 250a and a corresponding partitioned index 210a on which an embodiment of the invention may be implemented. Index 210a comprises synchronously updated index partitions 220a, 230a, and 240a. Table 250a comprises table partitions 260a, 270a, and 280a.

In one embodiment of the invention, the index 210a is a local index. Index partitions 220a, 230a, and 240a correspond to table partitions 260a, 270a, and 280a, respectively. Each table partition 220a, 230a, and 240a corresponds to an application. As an example, three applications may require the use of an access control list for security reasons, such as controlling access to files, processes, servers, or other resources associated with the application. The access control list for each application may be stored in the same table 250a. Each application will in turn place data only in its own table partition 280a which will be indexed by the corresponding index partition 240a.

FIG. 2B represents a modified version of FIG. 2A, and serves as an illustration of an embodiment of the invention using XML DB. Although XML DB is used as an example in this embodiment, the invention is not so restricted and may be used in conjunction with the storage or modification of any data. When a new application makes a request to load bulk XML-formatted ACL data into table 250b, a new, empty table partition 260b is created for the application in index 210b. A corresponding index partition 220b is also created to index the table partition 260b.

When the new index partition 220b is created, it is marked as asynchronously maintained, while the other index partitions 230b, 240b are left as synchronously maintained partitions. Because only the new index partition 220b is marked as asynchronously maintained, the index 210b is not marked as unavailable and the query optimizer may still consider index partition 230b and index partition 240b when formulating a query plan. This is true, even while XML documents are being loaded into table partition 260b, while XML documents are being shredded, and while corresponding data is being loaded into index partition 220b.

A group of XML documents are loaded into table partition 260b either one row at a time, or using a bulk load utility. While data is being loaded into table partition 260b, the respective index partition 220b is not updated. Once the load process is complete, a synchronization operation 290 is commenced. The synchronization operation 290 may be automated, or invoked by a user of the system. In the example using XML DB, the synchronization operation 290 causes the documents stored in table partition 260b to be shredded and indexed in the corresponding index partition 220b. Once the synchronization operation 290 is complete, index partition 220b is marked as synchronously maintained.

The index partition 220b may remain synchronously maintained, or may be configured to return to an asynchronously maintained state by any user, administrator, or automatic means. For example, an administrator may choose to load a second batch of bulk data into table partition 260b, which is now a non-empty table partition. Index partition 220b is again marked as asynchronously maintained, and will remain asynchronously maintained until the synchronization operation 290 is completed. During this time, the benefits of bulk loading are reduced because table partition 260b contains data. However, since the entire index 210b is not marked as unusable, other applications will still benefit from the performance benefits associated with the availability of the index partition 230b and 240b corresponding to the table 270b and 280b for the application. Furthermore, since other partitions are marked as synchronously maintained, there is reduced need to consult log files associated with a system change number to complete database statements or queries.

In another embodiment, the data being loaded need not be bulk data. Index partition 220b may be configured to be marked as asynchronously updated every time data is added to the corresponding table partition 260b. The synchronization operation 290 may be called after a period of time, or may be automatically invoked following the addition of data to table 260b.

In one embodiment, more than one bulk load operation takes place at the same time. For example, bulk data may be loaded into table 350 by two applications. When the first application begins loading data, a table partition 360 and a corresponding index partition 320 are created, as in the first example. The index partition 320 for the first application is marked as asynchronously maintained, and data begins to load into the table partition 360. Meanwhile, a second application begins loading data. A table partition 370 and a corresponding index partition 330 are created. The index partition 330 is also marked as asynchronously maintained, and data begins to load into the table partition 360. At this point, the state of the index is such that index partitions 320 and 330 are asynchronously maintained, while index partition 340 is synchronously maintained. Even though multiple applications are loading bulk data, the query optimizer is able to use index partition 340 in formulating a query plan, since the index 310 is not marked as unusable. Further, index partition 340 does not require the use of flashback queries.

When each application is finished loading data, a separate synchronization operation 390 and 395 will be called, synchronizing each respective table partition 360 and 370 with its index partition 320 and 330. The second application may finish loading data before the first application. In this example, the index partition 330 for the second application would synchronize 395 and be marked as synchronously maintained while the first application finishes loading data. Alternatively, the system can be configured to wait until all bulk loading is finished before synchronizing. When the first application is finished loading data, the table partition 360 associated with the application will synchronize 390 with the corresponding index partition 320 and the corresponding index partition 320 be marked as synchronously maintained.

Data need not be added to a table to take advantage of the invention. In fact, the invention may be used where any modification to a table is made. In one embodiment, a bulk delete operation may be performed on table 250b. When a bulk delete operation deleting all or part of the contents of table partition 260b is executed, the corresponding index partition 220b is marked as asynchronously maintained. During the bulk delete operation, other index partitions 230b and 240b are synchronously maintained, and not marked as unusable. Thus, the query optimizer will consider index partitions 230b and 240b when formulating a query plan. Furthermore, results are not stale, and there is no requirement of using flashback queries.

Hardware Overview

Figure 4:
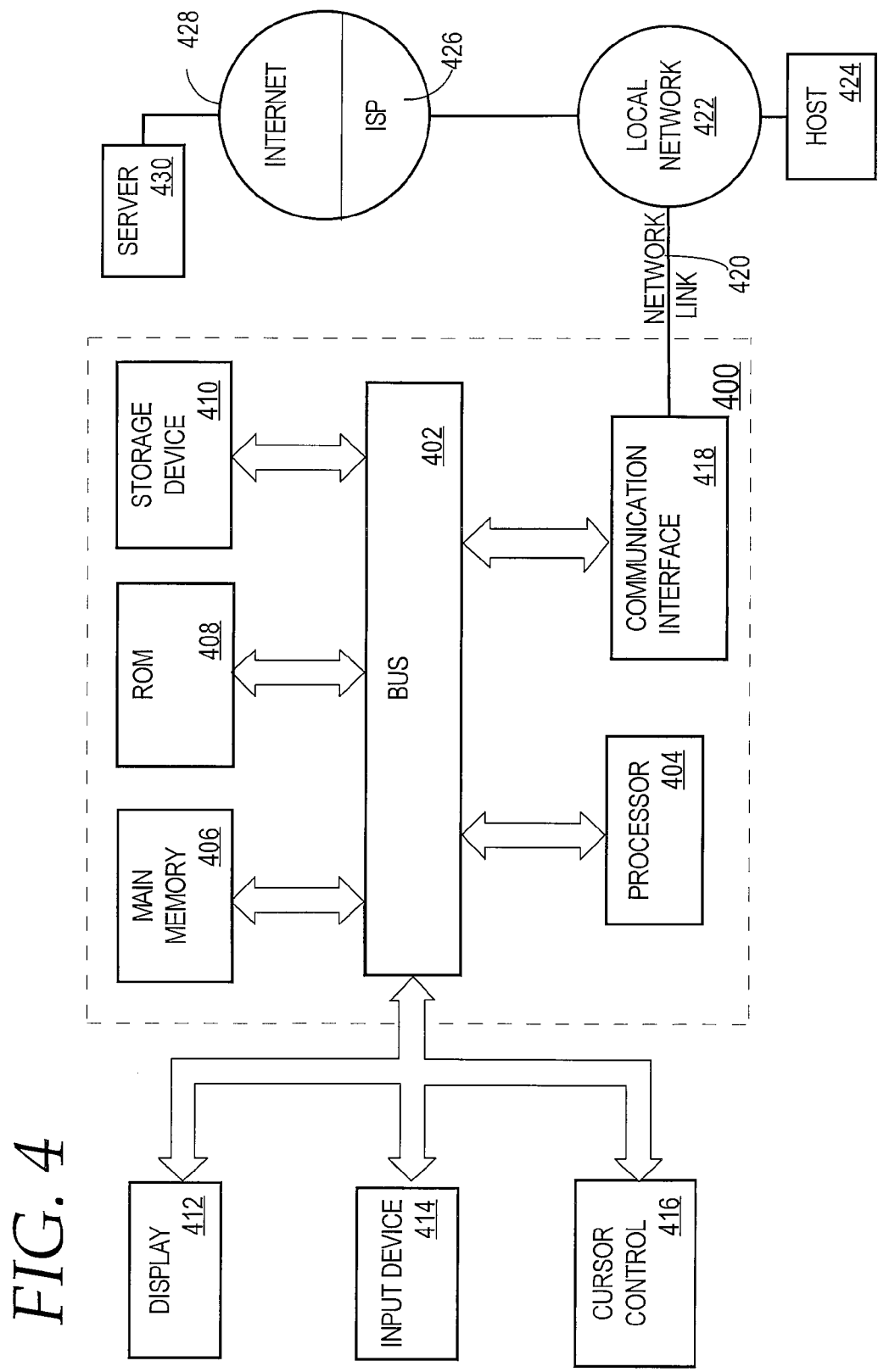
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The terms "machine-readable medium" and "computer-readable medium" as used herein refer to any medium that participates in providing data that causes a machine or computer, respectively, to operate in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. The terms "machine-readable storage medium" and "computer-readable storage medium" refer to volatile and non-volatile media upon which data can be stored. Transmission media includes coaxial cables, copper wire and fiber optics, including the wires that comprise bus 402. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use a transmitter to convert the data to a signal. A detector can receive the data carried in the signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
modifying and accessing a table indexed by an index,
wherein said table comprises table partitions;
wherein said index comprises index partitions, wherein each of said index partitions indexes a respective table partition of said table partitions;
wherein modifying and accessing said table comprises:
performing a set of modifications to a certain table partition of said table partitions without synchronously updating the respective certain index partition of said certain table, wherein after completing said set of modifications, said certain index partition and said certain table partition are left in an unsynchronized state; and
while said certain index partition and said certain table partition are left in said unsynchronized state, receiving queries that require access to said table;
using said index to compute said queries without rewriting said queries to be flashback queries;
performing a synchronization operation, wherein performing a synchronization operation comprises conforming data in said certain index partition to corresponding data in said certain table partition;
wherein the method is performed by one or more computing devices.

2. The method of claim 1, wherein the step of using said index further comprises using said index to compute said queries that only require access to table partitions of said table partitions other than said certain table partition.

3. The method of claim 1, wherein the step of performing a set of modifications to a certain table partition comprises adding data to said certain table partition.

4. The method of claim 1, further comprising:
after the step of performing said synchronization operation, designating said particular index partition as synchronously maintained.

5. A method, comprising:
executing database statements that require access to a table and that have not been rewritten to be flashback database statements;
wherein executing the database statements includes using an index to access said table;
wherein said table comprises table partitions;
wherein said index comprises index partitions, wherein each of said index partitions indexes a respective table partition of said table partitions;
while executing said database statements, performing a set of modifications to a certain table partition of said table partitions without synchronously updating said respective index partition of said certain table partition;
performing a synchronization operation, wherein performing a synchronization operation comprises conforming data in said certain index partition to corresponding data in said certain table partition;
wherein the method is performed by one or more computing devices.

6. The method of claim 5, wherein the step of performing a set of modifications to a certain table partition comprises adding data to said certain table partition.

7. The method of claim 5, further comprising:
after the step of performing said synchronization operation, designating said particular index partition as synchronously maintained.

8. A computer-readable non-transitory storage medium carrying one or more sequences of instructions which, when executed by one or more processors, causes the one or more processors to perform:
modifying and accessing a table indexed by an index,
wherein said table comprises table partitions;
wherein said index comprises index partitions, wherein each of said index partitions indexes a respective table partition of said table partitions;
wherein modifying and accessing said table comprises:
performing a set of modifications to a certain table partition of said table partitions without synchronously updating the respective certain index partition of said certain table, wherein after completing said set of modifications, said certain index partition and said certain table partition are left in a unsynchronized state; and
while said certain index partion and said certain table partition are left in said unsynchronized state, receiving queries that require access to said table;
using said index to compute said queries without rewriting said queries to be flashback queries;
performing a synchronization operation, wherein performing a synchronization operation comprises conforming data in said certain index partition to corresponding data in said certain table partition.

9. The computer-readable non-transitory storage medium of claim 8, wherein the using said index further comprises using said index to compute said queries that only require access to table partitions of said table partitions other than said certain table partition.

10. The computer-readable non-transitory storage medium of claim 8, wherein performing a set of modifications to a certain table partition comprises adding data to said certain table partition.

11. The computer-readable non-transitory storage medium of claim 10, wherein the instructions further include instructions for:
after the step of performing said synchronization operation, designating said particular index partition as synchronously maintained.

12. A computer-readable non-transitory storage medium carrying one or more sequences of instructions which, when executed by one or more processors, causes the one or more processors to perform:
executing database statements that require access to a table and that have not been rewritten to be flashback database statements;
wherein executing the non-flashback database statements includes using an index to access said table;

wherein said table comprises table partitions;
wherein said index comprises index partitions, wherein each of said index partitions indexes a respective table partition of said table partitions;
while executing said database statements, performing a set of modifications to a certain table partition of said table partitions without synchronously updating the respective certain index partition of said certain table partition;
performing a synchronization operation, wherein performing a synchronization operation comprises conforming data in said certain index partition to corresponding data in said certain table partition.

13. The computer-readable non-transitory storage medium of claim 12, wherein the step of performing a set of modifications to a certain table partition comprises adding data to said certain table partition.

14. The computer-readable non-transitory storage medium of claim 12, wherein the instructions further include instructions for:
   after the step of performing said synchronization operation, designating said particular index partition as synchronously maintained.

* * * * *

UNITED STATES PATENT AND TRADEMARK OFFICE
CERTIFICATE OF CORRECTION

PATENT NO. : 8,380,702 B2  
APPLICATION NO. : 12/401397  
DATED : February 19, 2013  
INVENTOR(S) : Baby et al.

Page 1 of 1

It is certified that error appears in the above-identified patent and that said Letters Patent is hereby corrected as shown below:

On title page, in column 2, item [57] under "Abstract", line 5, delete "in" and insert -- is --, therefor.

In the Specifications

In column 2, line 37, delete "SQLLOADER" and insert -- SQL LOADER --, therefor.

In column 8, line 48, before "optical" insert -- or --.

In the Claims

In column 9, line 28, in Claim 1, delete "an" and insert -- a --, therefor.

In column 10, line 33, in Claim 8, delete "partion" and insert -- partition --, therefor.

Signed and Sealed this
Fourteenth Day of May, 2013

Teresa Stanek Rea
*Acting Director of the United States Patent and Trademark Office*